United States Patent
Schwarzer et al.

(10) Patent No.: US 11,545,868 B2
(45) Date of Patent: Jan. 3, 2023

(54) ELECTRIC MOTOR, IN PARTICULAR A SEPARATELY EXCITED SYNCHRONOUS MOTOR

(71) Applicant: AUDI AG, Ingolstadt (DE)

(72) Inventors: Michael Schwarzer, Munich (DE); Peter Maischak, Hepberg (DE); Eike Janssen, Hude (DE); Benjamin Weis, Westhausen (DE)

(*) Notice: Subject to any disclaimer, the term of this patent is extended or adjusted under 35 U.S.C. 154(b) by 0 days.

(21) Appl. No.: 17/331,364

(22) Filed: May 26, 2021

(65) Prior Publication Data
US 2021/0376683 A1    Dec. 2, 2021

(30) Foreign Application Priority Data
May 29, 2020   (DE) .......................... 102020114457.1

(51) Int. Cl.
*H01R 39/26*    (2006.01)
*H02K 5/14*    (2006.01)
*H01R 39/38*    (2006.01)

(52) U.S. Cl.
CPC .............. *H02K 5/141* (2013.01); *H01R 39/26* (2013.01); *H01R 39/381* (2013.01)

(58) Field of Classification Search
CPC ....... H02K 5/141; H01R 39/26; H01R 39/381
See application file for complete search history.

(56) References Cited

U.S. PATENT DOCUMENTS

| | | | | |
|---|---|---|---|---|
| 426,471 A | * | 4/1890 | Rice ..................... | H01R 39/381 310/239 |
| 2,532,827 A | * | 12/1950 | Thomas ............... | H01R 39/381 310/246 |
| 2,607,817 A | * | 8/1952 | Leopold ............... | H01R 39/381 310/245 |
| 2,683,829 A | | 7/1954 | Gerber | |
| 4,121,207 A | * | 10/1978 | Jones ..................... | H01R 39/58 200/61.4 |
| 7,880,362 B2 | * | 2/2011 | Cutsforth ............. | H01R 39/381 310/239 |
| 9,385,576 B2 | * | 7/2016 | Jiang ..................... | H02K 11/026 |
| 9,640,929 B2 | * | 5/2017 | Braun ................... | H01R 39/381 |
| 2009/0096315 A1 | * | 4/2009 | Mantle ................. | H01R 39/381 310/239 |

FOREIGN PATENT DOCUMENTS

DE    1 488 671 C    6/1971
DE    103 32 302 A1    2/2005
(Continued)

*Primary Examiner* — Dang D Le
(74) *Attorney, Agent, or Firm* — Seed Intellectual Property Law Group LLP

(57) ABSTRACT

An electric motor, in particular a separately excited synchronous motor, has a rotor shaft with at least one slip ring and at least one electrically conductive contact element, in particular a carbon brush, which bears against the slip ring and is accommodated in a channel-like guide formed in a housing and extending radially with respect to the rotor shaft and which carbon brush is radially tensioned against the slip ring by means of a spring element, wherein a roller is provided which is tensioned laterally against the contact element via a further spring element and via which the contact element is tensioned against a wall of the guide.

10 Claims, 2 Drawing Sheets

(56) References Cited

FOREIGN PATENT DOCUMENTS

| | | |
|---|---|---|
| DE | 10 2006 035 440 A1 | 5/2008 |
| DE | 10 2011 085 997 A1 | 5/2013 |
| DE | 10 2013 226 774 A1 | 7/2015 |
| EP | 0 455 253 A2 * | 5/1991 ............ H01R 39/39 |
| JP | 2003-079108 A | 3/2003 |

* cited by examiner

ELECTRIC MOTOR, IN PARTICULAR A SEPARATELY EXCITED SYNCHRONOUS MOTOR

BACKGROUND

Technical Field

Embodiments of the invention relate to an electric motor, in particular a separately excited synchronous motor.

Description of the Related Art

Different designs of electric motors are known. It is necessary in various types of motors to contact a rotating component, in particular a rotor or a rotor shaft, in order to supply current to individual conductor windings to build up a magnetic field or, for example, in order to pick up measurement signals from such a rotating component. An example of such an electric motor is a separately excited synchronous motor. This has a rotor with a rotor shaft on which at least one, but normally however several, slip ring(s) is/are provided in a quantity corresponding to the number of individual phases, which slip ring(s) is/are coupled to individual coil windings by means of which, when the windings are energized, an excitation magnetic field is generated. In order to be able to supply the current to the individual windings, an electrically conductive contact element, usually in the form of a carbon brush, is assigned to the/each slip ring, which contact element or carbon brush is positionally fixed or alternatively fixed to the housing, whereas the rotor shaft and therefore the assigned slip ring naturally rotate. The contact element or respectively the carbon brush is normally accommodated in a housing in a there formed channel-like guide and is pressed radially or respectively is pressed in an essentially radial manner against the slip ring. This generates an electrical sliding contact. Due to manufacturing and assembly-related tolerances, as well as wear over the service life, the slip ring surface sometimes runs slightly out of true. Since the contact element or respectively the carbon brush as well as the spring-loading spring element form a resonant system due to properties of mass and rigidity, the contact element is sometimes excited to vibrate during operation, which leads to movement of the contact element in the guide. If the excitation is weak, for example at low speeds, the contact element can still be prevented from lifting off from the slip ring or tilting within the guide by spring-loading the contact element via the spring element. In the case of strong excitation, however, the contact element is sometimes lifted off the slip ring and/or tilted in the guide, i.e., the contact element wobbles within the guide. This results in the electrical sliding contact being interrupted in the event of lift-off or the current-carrying surface being reduced in the event of tipping, both being able to cause a number of problems. In the case of lift-off, no excitation current can be transmitted, and in the case of tilting, the required excitation current cannot be transmitted, and consequently the excitation magnetic field can temporarily not be generated in the required manner. Sometimes arcing can occur, and, of course, increased wear of the contact element as well as the slip ring can be observed when these effects occur.

In order to prevent, as much as is possible, such relative movement or wobbling of the contact element, DE 10 2011 085 997 A1 teaches us in addition to axial tensioning within the guide, which leads to radial spring-loading against the slip ring, that the contact element can also be tensioned laterally in the guide, i.e., against a guide wall. This results in guidance of the contact element in the guide without any play. In DE 10 2011 085 997 A1, a spiral spring is used for this purpose, one end of which presses on the contact element from above, thus spring-loading it axially in the guide and thereby radially against the slip ring. The other end of the spiral spring is connected to a swivel arm which can be swiveled about a swivel axis and which is spring-loaded by means of this one spring element so that it is tensioned in the direction of the side surface of the contact element. A roller is arranged at the end of the swivel arm, which is laterally spring-loaded by means of the swivel arm and thus by means of the one common spring element against the contact element, in this case a carbon brush, and tensions the contact element against the opposite guide wall.

The construction of this known contact element arrangement or respectively this known carbon brush holder is very complex. This inasmuch as on the one hand, a very special spring element, namely the spiral spring, must be used, which must be designed very specifically in terms of its spring properties. On the one hand, the spiral spring must be designed in such a way that a defined, but neither too small nor too large axial tension is exerted against the slip ring for radial deflection. On the other hand, it must be designed in such a way that the swivel arm and thereby the roller are simultaneously spring-loaded in a defined manner, but neither too weakly nor too strongly against the side of the carbon brush. In the event that axial tension is too weak, the arrangement has an increased tendency to oscillate because the contact pressure is too low. If the axial contact pressure is too strong, wear is too great. If the lateral contact pressure is too low, this lateral tensioning does not fulfill its purpose, since stronger excitation can still result in tilting or respectively wobbling. If the contact pressure is too strong, the surface pressure of the contact element against the guide wall is too great, resulting in increased friction and possibly insufficient axial tensioning or respectively tracking. In addition, a specifically shaped swivel arm must be used, which on the one hand must be pivotably mounted on a housing component, for which purpose a corresponding bearing axis is provided, and on the other hand is to be connected to the end of the coil spring. In addition, a bearing axis must be provided on the swivel arm, to which in turn the roller is fixed.

BRIEF SUMMARY

In some embodiments, an electric motor, in particular a separately excited synchronous motor, is provided comprising a rotor shaft with at least one slip ring and at least one electrically conductive contact element, in particular a carbon brush, which bears against the slip ring and is accommodated in a channel-like guide formed in a housing, and extending radially with respect to the rotor shaft and which carbon brush is radially tensioned against the slip ring by means of a spring element, wherein a roller is provided which is tensioned laterally against the contact element by means of a further spring element and by means of which the contact element is tensioned against a wall of the guide.

In the electric motor, two separate spring elements are provided which serve different purposes. They each serve to spring-load the contact element, i.e., in particular the carbon brush, however in different directions. The first spring element is used for axial tensioning within the elongated guide, i.e., the contact element channel, by means of which the contact element is tensioned radially against the slip ring. The second spring element is used for tensioning a roller against the side surface of the contact element in order to tension it against the guide wall. The tensioning directions are thus orthogonal to each other, each tensioning serving a different purpose. The fact that two separate spring elements are used makes it possible to use specific spring elements or respectively to design or select the spring elements in terms of their spring properties in such a way that they can optimally fulfill their tensioning task. For axial tensioning, an optimized spring element can be selected which generates the defined and exact contact pressure with which the contact element is ideally spring-loaded against the slip ring. It is selected so that the resulting contact pressure is neither too weak nor too strong, but lies within an optimum pressure range. In the same way, the other spring element can also be selected in an optimized way so that here, too, an optimum contact pressure or an optimum surface pressure of the contact element against the guide wall is obtained. Here, too, the resulting contact pressure or respectively surface pressure lies within a defined range, so that it in turn can be ensured that the contact pressure is neither too weak nor too strong and consequently there is neither too little nor too much friction between the contact element and the guide wall. As a consequence, the use of separate spring elements therefore permits optimum design of the individual tensions exerted. In addition, the solution also offers the possibility of using simply designed spring elements instead of a spiral spring with complex implementation and design, since these springs are only required to fulfill a tensioning task or respectively generate the pretension in only one defined direction.

The further spring element for lateral spring-loading of the roller is appropriately a coil spring coupled to the roller, which exerts an axial tensioning force on the roller. This means that the coil spring is arranged with its longitudinal axis virtually orthogonal to the surface of the contact element and thus to the wall surface, and spring-loads the roller orthogonally against the contact element. On the one hand, such a coil spring is sufficiently small, but on the other hand it is also a very simple spring element that can be precisely designed in terms of its spring properties in order to generate optimum contact pressure.

The roller itself is arranged on a roller holder, which has a retaining plate on which the coil spring engages. This retaining plate provides a sufficiently large contact or respectively attachment surface on which the spring element or respectively coil spring engages or respectively rests. This retaining plate can be provided with a round projection, upon which the coil spring is clamped so that it is securely fixed to the retaining plate. The opposite end of the coil spring is supported on a suitable abutment surface, whereby a corresponding, round projection can also be formed on this abutment surface, onto which the coil spring is clamped.

As described, the roller is rotatably mounted on a roller holder. For this purpose, according to a further development, the roller holder has two arms which are connected to the retaining plate and on which a roller axis is arranged, on which the roller is mounted. In addition to the retaining plate, the roller holder therefore has the two arms which carry the roller axis, i.e., a simple pivot pin, on which the roller runs. This ensures a simple, but also stable design of the roller holder and, in particular, of the roller bearing.

The two arms pass through a housing wall which separates a space accommodating the coil spring from a space accommodating the roller, wherein at least one wall opening is provided in the housing wall through which the arms pass. This wall provides a corresponding spatial separation of the spring space and the roller space, which is naturally open to the guide or channel in which the contact element is arranged. This ensures, on the one hand, that the coil spring is protected from possible contamination by abrasion of the contact element, which is to say, for example, the carbon brush. On the other hand, this wall pass-through also provides guidance for the two arms so that lateral deflection and upward deflection are prevented. In other words, the wall pass-through is dimensioned in such a way that the two arms are accommodated with only slight lateral and vertical play.

As described, the further spring element is a coil spring. In contrast, the first spring element is a constant force spring, the one end of which is fixed to the housing and the other coiled end presses on the contact element from above. With such a simply designed, elongated, constant force spring, the contact pressure can again be adjusted in a very precise manner. The coiled end of the constant force spring presses from above onto the contact element, whereby a slight depression, i.e., a rest at least partially adapted to the geometry of the coiled end, is provided on the contact element if necessary, so that a certain positive locking is also provided in this area. The other end of the constant force spring is fastened to the housing, where it is engaged, for example, in a snap-in receptacle or the like.

Furthermore, it can be provided that a groove is provided in a housing wall delimiting the guide, in which an elongated section of the constant force spring extending from the end fixed to the housing to the coiled end is accommodated. Accordingly, the constant force spring is an elongated component. An elongated linear spring section which, in the assembled position, ultimately extends parallel to the contact element, is linked the rolled head, i.e., the coiled end. The lower end is, as described, suitably fixed to the housing. The constant force spring is arranged in such a way that the elongated section runs parallel to the side of the contact element that is pressed against the housing wall. In order to prevent the contact element from being pressed against the spring or respectively the section, a longitudinal groove is formed on this housing wall in which the elongated section of the constant force spring is accommodated. This is thus virtually accommodated in the housing wall in a recessed manner.

In addition to the electric motor itself, some embodiments further relate to a contact element holder for receiving an electrically conductive contact element for an electric motor, in particular a separately excited synchronous motor, as described above. The contact element holder comprises a housing with a channel-like guide, as well as a spring element for tensioning the contact element received in the guide in the longitudinal axis of the guide, as well as a roller and a further spring element for tensioning the roller laterally against the contact element in such a way that the contact element is tensioned against a wall of the guide.

The contact element holder, which may also already be equipped with the contact element, for example the carbon brush, is therefore a separate component that is fixed in a suitable receptacle of a motor housing. This receptacle is naturally located at a position adjacent to the rotating component, i.e., in particular the rotor shaft with its slip rings, so that the contact element holder can be positioned in the immediate vicinity of the contact point. The contact element holder can, for example, be screwed into the receptacle or fixed by means of a snap-in connection. In any case, the connection is such that the housing of the contact element holder is immovably fixed, so that no relative movement stemming from the mounting is possible.

As described, the contact element holder has its own housing. In the electric motor described above, either such a contact element holder with its own housing can be used. However, it is also conceivable that the motor housing or a suitable housing component alone is provided with a corresponding geometric design with guide, receiving space, etc., for direct arrangement of the individual elements, namely the contact element and the two spring elements.

The contact element holder, which has its own housing, is provided with a further spring element in the form of a coil spring coupled to the roller, which exerts an axial tensioning force on the roller. In doing so, the roller is arranged on a roller holder which has a retaining plate, on which the coil spring engages and on which it is fixed by a press fit on a suitable retaining projection. The opposite end of the coil spring is supported on a suitable housing wall of the contact element holder and is also pressed onto a retaining projection there.

The roller holder itself has two arms connected to the retaining plate, on which arms the roller axis is arranged, on which the roller is mounted. The two arms pass through a housing wall which separates a space accommodating the coil spring from a space accommodating the roller, wherein at least one wall opening is provided in the housing wall through which the arms pass. The two spaces are therefore formed on the housing of the contact element holder, as is the channel-like guide to which the space containing the roller is naturally open.

The spring element radially tensioning the roller is a constant force spring, one end of which is fixed to the housing and the coiled end of which presses on the contact element. Consequently, a suitable fastening geometry is provided on the housing, for example an insertion or clamping slot, a latching section or similar, where the constant force spring can be firmly fixed at its end. The coiled end presses from above onto the contact element, which may have a receiving recess for the round spring head.

A groove is further provided in a housing wall delimiting the guide in which is received an elongated section of the constant force spring extending from the end that is fixed to the housing to the coiled end.

BRIEF DESCRIPTION OF THE SEVERAL VIEWS OF THE DRAWINGS

Further advantages and details will be apparent from the embodiments described below and from the drawings.

DETAILED DESCRIPTION

Figure 1:
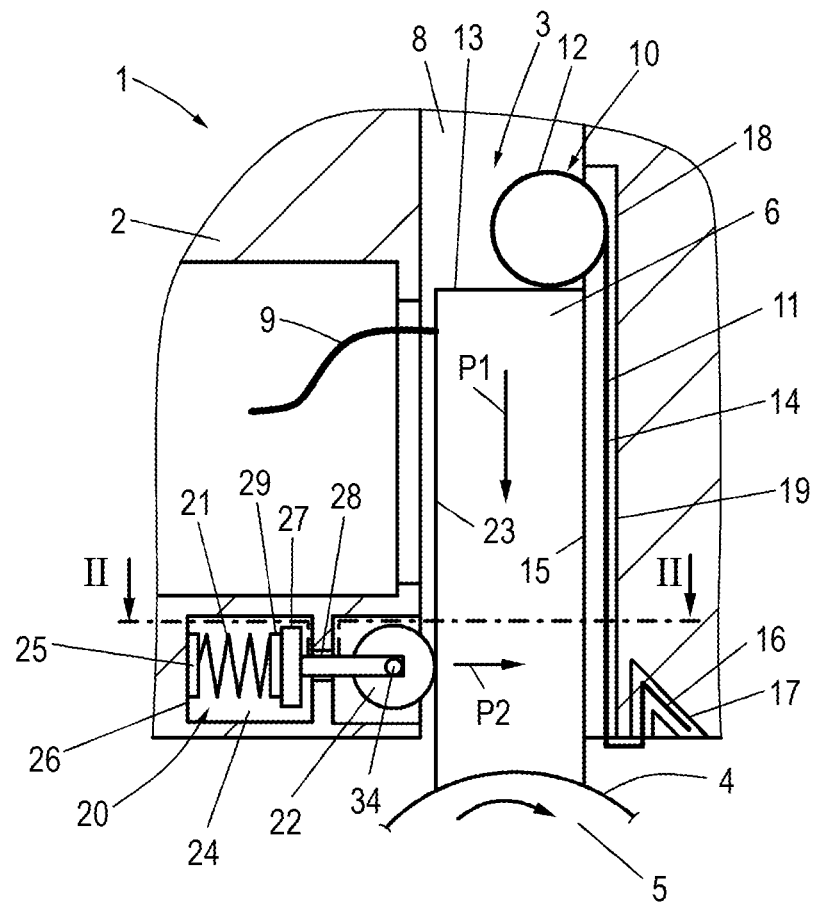
FIG. 1 shows a side view of an electrical motor with a contact element arrangement in a side view.

FIG. 1 shows a partial view of an electric motor 1, with a housing 2, in which a contact element arrangement 3 is provided which delivers an electrical contact to a slip ring 4 of a rotor shaft 5. On the rotor shaft 5, in the case of a separately excited synchronous motor, for example, normally a plurality of, most commonly three, slip rings are provided, which are assigned to different phases and are in turn coupled to different conductor windings for generating the excitation magnetic field.

The contact element arrangement 3 has on the one hand a contact element 6 that is in the form of a carbon brush. In this, we are dealing with an elongated contact element 6 with a rectangular cross-section, which has a trough-shaped geometry 7 on its underside, corresponding to the geometry of the slip ring 4 that is rotating in operation, onto which the contact element 6 is pressed onto. The contact element 6 is received in a guide 8 which is formed in the housing 2. The guide 8 is channel-like, open at the top, so that the contact element 6 or the carbon brush can be supplied from above. By means of a connection line 9, usually a copper strand, the contact element 6 is provided with an outgoing electrical contact which is connected to a power source.

A first spring element 10 is provided in the form of a constant force spring 11. This spring has a coiled end 12 which forms a spring head which rests on the upper side 13 of the contact element 6. This coiled end 12 connects to an elongated linear section 14 which runs virtually parallel to a side surface 15 of the contact element and passes over to a second end 16 which is received on the housing 2 in a suitable latching, tensioning or form-fitting receptacle 17, by means of which the constant force spring 11 is fixed. The elongated section 14 is accommodated in a groove 18 which is formed on the housing wall 19 which bounds the guide 8 and which is opposite the side 15 of the contact element 6, i.e., it is recessed with respect to the guide wall surface, as shown in particular in FIG. 2. By means of the first spring element 10, the contact element 6 is axially spring-loaded in the guide 8, as shown by the arrow P1, and, see FIG. 1, radially pre-tensioned against the slip ring.

Figure 2:
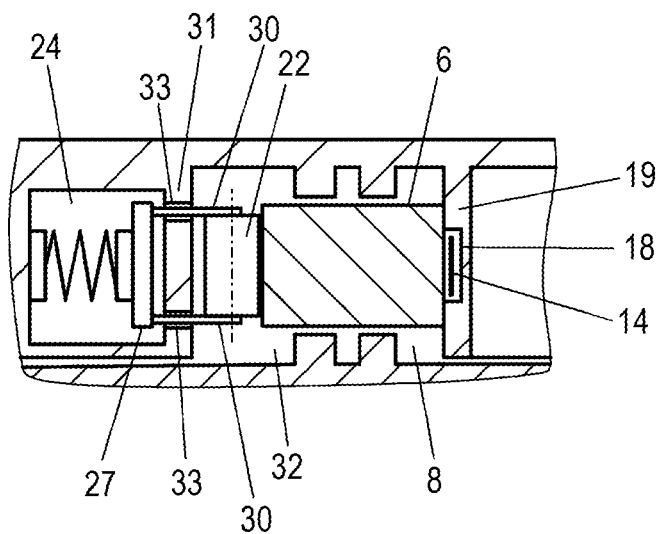
FIG. 2 shows the arrangement of FIG. 1 in a cross-sectional view along line II-II.

A second spring element 20 in the form of a coil spring 21 is also provided, which serves to spring-load a roller 22 from the side so that the side wall 15 is pressed against the guide wall 19, as FIG. 2 shows. The roller 22 therefore presses against the side wall 23 of the contact element 6 and thereby presses the latter against the guide wall 19. The tensioning direction is consequently orthogonal to the tensioning direction obtained by means of the first spring element 10.

In the housing 2, a receiving space 24 is provided in which the coil spring 21 is received. The end of the coil spring shown in FIG. 1 on the left is fixed, such as clamped, to a first retaining projection 25 on a wall 26 of the receiving chamber 24. The other end of the coil spring 21 rests against a retaining plate 27 of a roller holder 28 or alternatively is also fixed there on a holding projection 29, such as clamped.

Two arms 30 connect to the holder section 27, which arms reach through a wall opening 33 formed in a housing wall 31, which separates the receiving space 24 from a roller receiving space 32, see in particular FIG. 2. Each arm 30 is guided in a separate wall opening 33, the wall openings 33 being dimensioned in such a way that the arms 30 can be moved laterally and vertically only with limited play, so that secure guidance is provided.

A roller axis 34 in the form of a simple pivot pin is provided on the two arms 30, on which the roller 22 is rotatably mounted.

The two separate spring elements 10 and 20 make it possible to optimize the spring properties of both with respect to the actual spring task. On the one hand, the first spring element 10, i.e., the constant force spring 11, is designed in such a way that it exerts an ideal contact pressure of the contact element 6 against the slip ring 4 that is defined in relation to the specific application and lies within a predetermined range. In a corresponding manner, the second spring element 20, i.e., the coil spring 21, is designed in its spring properties in such a way that it exerts an optimum contact pressure that lies in a defined range, so that the contact element 6 is tensioned against the guide wall 19 with a defined pressing force. This double tensioning can ensure that any vibrations can be prevented or damped as well as possible, while at the same time creating ideal conditions in each tensioning direction or in each friction plane. This is what ensures that neither the contact element 6 is pressed too weakly or too strongly against the slip ring 4, nor the contact element 6 is pressed too weakly or too strongly against the guide wall 19. In the case of pressing against the slip ring, such a low contact pressure results in the contact element 6 being too easily excited to vertical vibrations, whereas too strong pressing results in excessive wear. A too weak pressing of the contact element 6 against the guide wall, results in a facilitation of the tilting of the contact element 6 in the guide 8, where the contact element is nevertheless accommodated with some play, whereas if the pressure is too strong, any tracking due to excessive friction is prevented.

Figure 3:
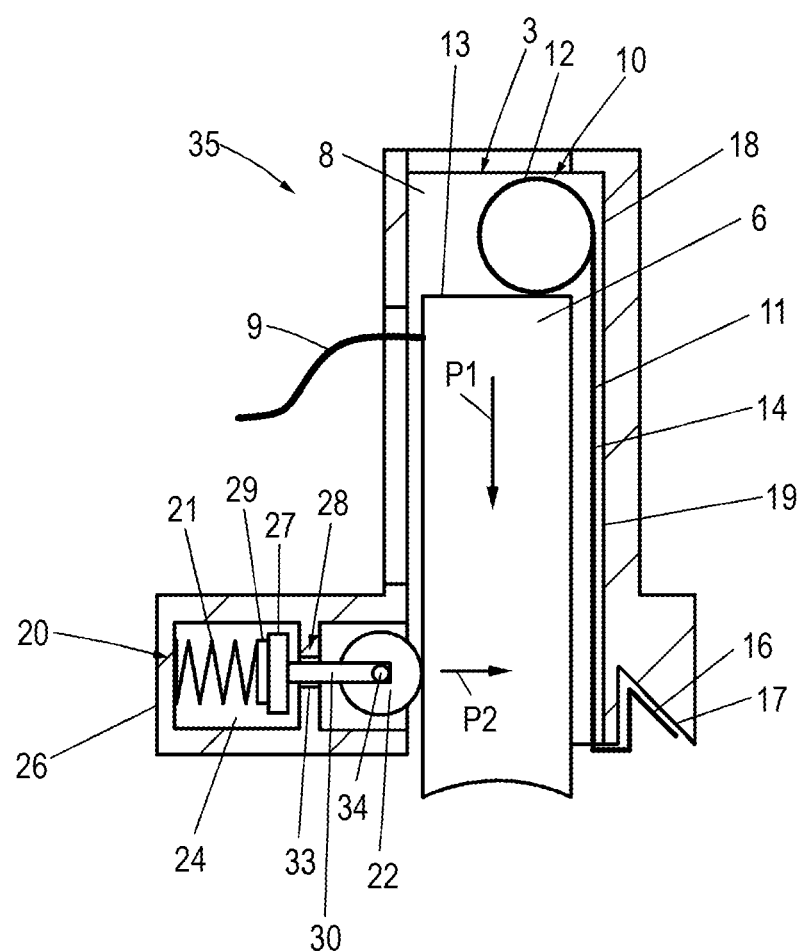
FIG. 3 shows a side view of a contact element holder.

FIG. 1 and FIG. 2 show an embodiment in which the corresponding arrangements for receiving or respectively integrating the contact element arrangement 3 are provided in the motor housing 2 itself. In contrast, FIG. 3 shows a contact element holder 35, which has its own housing 36 on which the corresponding arrangements for receiving the contact element 6 and the two spring devices are provided. The same reference signs are used for identical components in FIG. 1 and FIG. 2.

Thus, a channel-like guide 8 is also formed in the housing 36, which is delimited by corresponding walls. A first spring element 10 is here again formed as a constant force spring 11, with the upper coiled end 12, the elongated section 14 and the lower end 16, which is also here again hooked correspondingly in a receptacle 17.

Also provided is a second spring element 20 in the form of a coil spring 21, which is accommodated in a receiving space 24 and is supported at one end on a housing wall 26 and at the other end on a retaining plate 27 of a roller holder 28. This holder in turn has two arms 30, which reach through the wall 28 in corresponding openings 33, and which support the rotatably mounted roller 22 on a roller axis 34. The function is the same as for the design according to FIGS. 1 and 2, here, too, the contact element 6 is tensioned in a double but separate manner by means of individual and consequently optimized spring elements 10, 20.

The advantage of this separate roller holder is that the entire contact element arrangement 3 can be prefabricated and the complete roller holder 35 can be installed as a prefabricated component. It is only still necessary to connect the connection line 9.

German patent application no. 10 2020 114457.1, filed May 29, 2020, to which this application claims priority, is hereby incorporated herein by reference, in its entirety.

Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric motor, comprising:
   a housing including a channel-like guide;
   a rotor shaft;
   a slip ring;
   an electrically conductive contact element that bears against the slip ring, that is accommodated in the channel-like guide, that extends radially with respect to the rotor shaft, and that is radially biased toward the slip ring by a first spring element; and
   a roller that bears against the contact element, that is biased laterally toward the contact element by a second spring element, and that biases the contact element toward a wall of the channel-like guide;
   wherein the roller is arranged on a roller holder, the roller holder has a retaining plate, and the second spring element engages the retaining plate;
   wherein the roller holder has two arms connected to the retaining plate, and the roller is mounted on the two arms; and
   wherein the two arms extend through a wall opening of a housing wall that separates a space accommodating the second spring element from a space accommodating the roller.

2. The electric motor according to claim 1 wherein the electric motor is a separately excited synchronous motor.

3. The electric motor according to claim 1 wherein the electrically conductive contact element is a carbon brush.

4. The electric motor according to claim 1, wherein the second spring element is a coil spring coupled to the roller, which exerts an axial biasing force on the roller.

5. The electric motor according to claim 1, wherein the first spring element is a constant force spring, which is fixed with one end to the housing and presses with a coiled end from above onto the contact element.

6. The electric motor according to claim 5, wherein a groove is provided in a housing wall delimiting the guide, in which groove an elongated section of the constant force spring extending from the end fixed to the housing to the coiled end is received.

7. A contact element holder for receiving an electrically conductive contact element for an electric motor including a rotor shaft, a slip ring, and an electrically conductive contact element that bears against the slip ring, the contact element holder comprising:
   a housing including a channel-like guide configured to receive the contact element;
   a first spring element for biasing the contact element received in the guide in a longitudinal axis of the guide; and
   a roller and a second spring element for biasing the roller laterally against the contact element in such a way that the contact element is biased against a wall of the guide;
   wherein the roller is arranged on a roller holder, the roller holder has a retaining plate, and the second spring element engages the retaining plate;
   wherein the roller holder has two arms connected to the retaining plate, and the roller is mounted on the two arms; and
   wherein the two arms extend through a wall opening of a housing wall that separates a space accommodating the second spring element from a space accommodating the roller.

8. The contact element holder according to claim 7, wherein the second spring element is a coil spring coupled to the roller, which exerts an axial biasing force on the roller.

9. The contact element holder according to claim 7, wherein the first spring element is a constant force spring, which is fixed with one end to the housing and presses with a coiled end from above onto the contact element.

10. The contact element holder according to claim 9, wherein a groove is provided in a housing wall delimiting the guide, in which groove an elongated section of the constant force spring extending from the end fixed to the housing to the coiled end is received.

* * * * *